3,285,629
METHODS AND APPARATUS FOR MOUNTING ELECTRICAL CABLE IN FLEXIBLE DRILLING HOSE
Roy H. Cullen, Jimmie R. Aker, and Charles H. Elliott, Houston, Tex.; said Aker and said Elliott assignors to Roy H. Cullen, Houston, Tex.
Filed Dec. 11, 1963, Ser. No. 329,734
2 Claims. (Cl. 285—119)

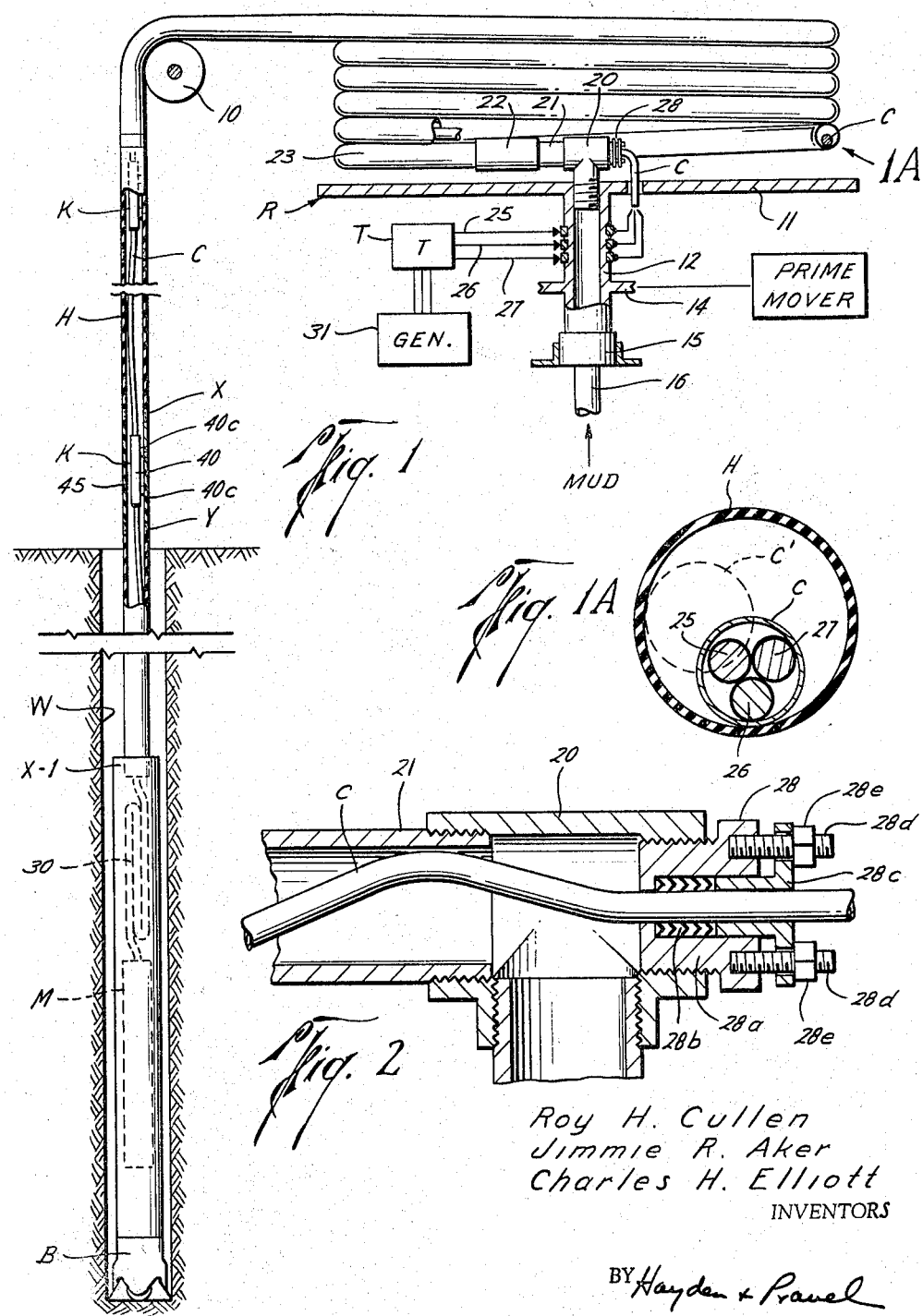

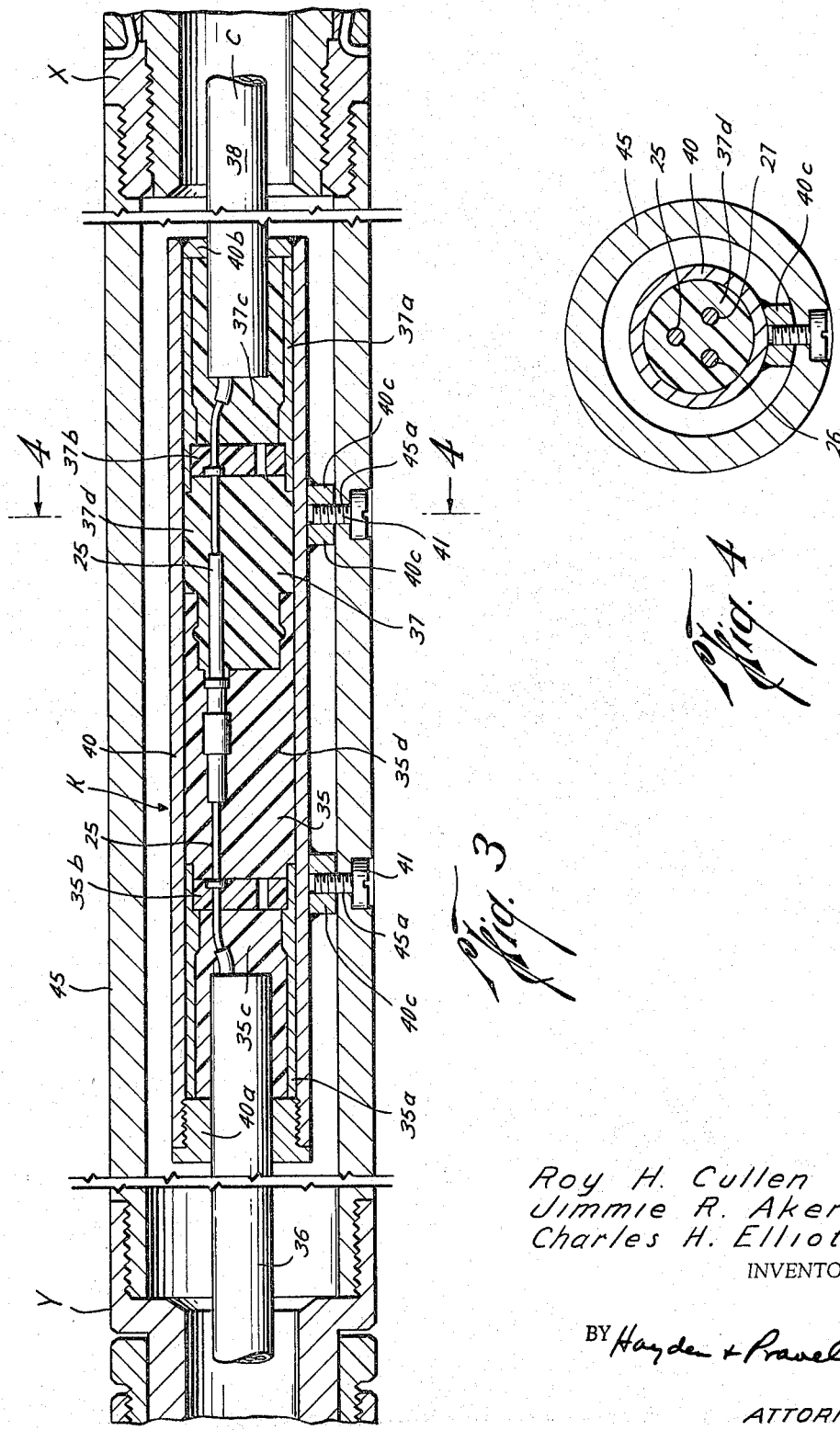

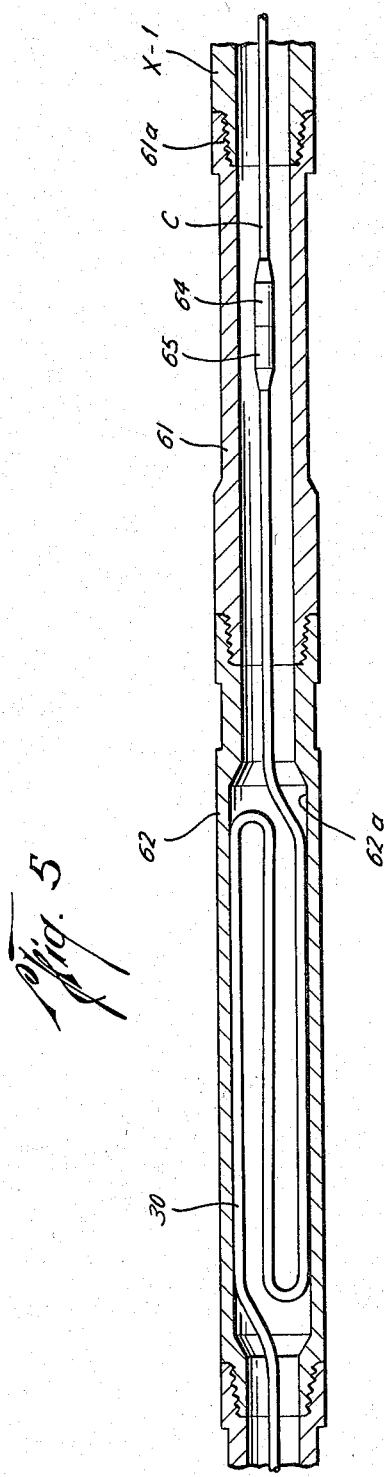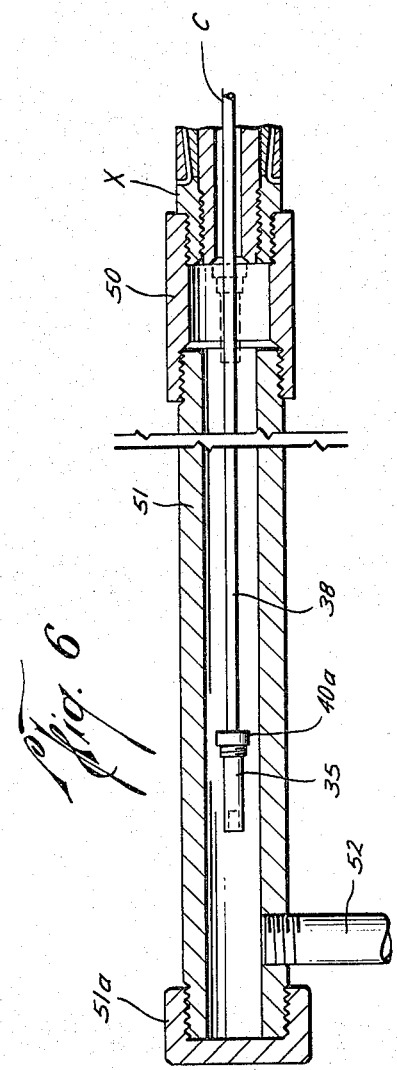
Roy H. Cullen
Jimmie R. Aker
Charles H. Elliott
INVENTORS
BY Hayden & Pravel
ATTORNEYS

United States Patent Office 3,285,629
Patented Nov. 15, 1966

This invention relates to methods and apparatus for mounting electrical cable in flexible drilling hose.

Normally, wells are drilled using steel drill pipe for supporting and rotating a drill bit, with the power for rotation being obtained at the ground level through a rotary table and kelly. However, as illustrated in U.S. Patents 2,892,535; 2,915,323; 2,989,980 and 3,004,779, it is now possible to construct a flexible drilling hose and apparatus for handling same so that the flexible hose takes the place of the former steel drill pipe. When such flexible hose is used, the drill bit is rotated by an engine or other power source located in the well bore in proximity to the drill bit. With the present invention, the drill is rotated by a motor which has electricity supplied thereto by an electrical cable extending through the hose. Since the cable is thus handled together with the hose, both being reeled and unreeled at the surface, and also since the drilling mud flowing in the hose flows around the cable, a number of peculiar problems were presented, which are solved by the present invention.

It is therefore an object of this invention to provide a new and improved method and apparatus for mounting electrical cable in flexible drilling hose.

An important object of this invention is to provide a new and improved method and apparatus for mounting an electrical cable in a flexible drilling hose so that drilling mud can be conveyed through the hose externally of the cable without danger of the hose blocking off or otherwise preventing an adequate flow of the mud.

Another object of this invention is to provide a new and improved method and apparatus for mounting an electrical cable in a flexible drilling hose wherein the cable and hose are adapted to be reeled and unreeled at the surface without breaking the cable or disconnecting any of the electrical connections therein.

A further object of this invention is to provide a new and improved method and apparatus for mounting an electrical cable in a flexible hose wherein the cable is attached in sections to the hose at predetermined intervals throughout the length of the hose, each of such cable sections being confined in a slack condition or in undulations between two of the points of attachment to the hose when reeled so as to prevent breaking of the cable sections, or disconnection of adjacent cable sections, when unreeled and suspended in a well bore.

A particular object of this invention is to provide a new and improved method and apparatus for mounting an electrical cable in a flexible hose wherein means are provided near the lower end of the cable for disconnecting sections of the cable when it becomes necessary or desirable to disconnect the hose from the drill bit and the drive means therewith.

Still another object of this invention is to provide a new and improved method for mounting an electrical cable in a flexible hose wherein the cable is fixed at one point to the hose, thereafter drilling mud or other liquid is caused to flow along the free portion of the cable to force an amount of cable into the hose, and thereafter the free end of the cable is secured to the hose.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a view, partly in elevation and partly in section, illustrating schematically the apparatus of this invention as used in conjunction with a drill bit;

FIG. 1A is a sectional view illustrating the relationship between the cable and the flexible hose when reeled together;

FIG. 2 is a sectional view, partly in elevation, illustrating a portion of the apparatus for mounting the cable internally of the flexible hose;

FIG. 3 is a sectional view illustrating further details of the apparatus for mounting the electrical cable within the bore of the flexible hose at predetermined intervals throughout the length of the hose and cable;

FIG. 4 is a sectional view taken on line 4—4 of FIG. 3;

FIG. 5 is a view, partly in elevation and partly in section, illustrating the apparatus for mounting the cable within the hose so as to facilitate the disconnection of the cable and the hose from the drilling apparatus, at a point near the lower end of the hose and cable; and FIG. 6 is a sectional view illustrating one manner of forcing the cable into the flexible hose with flowing fluid.

In the drawings, the letter H designates generally the flexible hose of this invention which is adapted to be used in conjunction with a drill bit B for the drilling of a well bore W or similar operations. The apparatus of this invention includes a means for mounting an electrical cable C within the flexible hose H so that the hose H and the cable C therewith may be reeled and unreeled from any suitable reel means R during the drilling of the well bore W with the drill bit B. Thus, with this invention, drilling mud or other fluid is adapted to be conducted through the flexible drilling hose H around the cable C and at the same time, the cable C is adapted to supply electrical power to a motor M which is connected to the drill bit for rotating same in the drilling of the well bore W.

Considering the invention more in detail, the hose H may be of any suitable construction capable of supporting the drilling apparatus in a well bore, but preferably the hose H is constructed as illustrated and described in United States Patents 2,825,364 and 3,004,779. In FIG. 1, a roller 10 is indicated for positioning and feeding the hose H into and out of the well bore W. In actual practice, it is preferred to employ an apparatus such as that shown in United States Patent 2,892,535 so that the lowering and raising of the hose H may be controlled. It will also be appreciated that the reel means R is shown schematically, such reel means R being of any suitable type, preferably of the type shown in United States Patent 2,989,980.

As schematically illustrated in FIG. 1, the reel means R includes a rotatable base 11 which supports the reeled portion of the hose H. Such base 11 is rotatable for reeling and unreeling the hose H as it is fed into and pulled from the well bore W. The rotatable stem 12 connected to the base plate 11 is rotated by a prime mover through a suitable drive gear 14 or other similar means. A swivel 15 is preferably provided for connecting in the fixed mud inlet pipe 16 so that mud or other drilling fluid can be introduced into the bore of the rotatable pipe 12 for supplying the mud through the hose H to the drill bit B in drilling operations.

The fixed end of the hose H is secured to the reel R by any suitable means such as schematically indicated in FIGS. 1 and 2, wherein a T pipe section 20 is connected for receiving the mud discharge in the rotatable tubular portion 12. The T 20 is suitably coupled through a rigid pipe section 21 and a coupling 22 to the end 23 of the hose H.

The cable C which normally has three electrical conductors 25, 26 and 27 therein (FIGS. 1 and 1-A) is fed into the T 20 and then the hose H through a suitable seal and clamping mechanism indicated generally at 28. Such mechanism 28 includes a threaded packing gland housing 28a having a flexible seal material or packing 28b therein for sealing engagement with the external surface of the cable C. A packing gland 28c is adapted to be urged inwardly to increase the sealing action of the seal 28b by means of threaded studs 28d which carry nuts 28e thereon. Thus, the cable C is fixed to the hose H at the mechanism 28 for a purpose to be hereinafter described.

Electrical power is supplied to the conductors 25, 26 and 27 as schematically indicated in FIG. 1 through a transformer T which is connected to any suitable conventional generator 31.

At predetermined intervals throughout the length of the hose H, the cable C is fixed to the inside of the hose H while still allowing mud or fluid flow around such connection, one type of which is indicated in FIGS. 1 and 3 at K. As will be more fully explained, the connections K serve a two-fold purpose by confining each of the sections of the hose between two of such connectors K, namely, an adequate amount of cable is provided in the hose to permit reeling, unreeling and a suspending in a well bore without breaking the cable or inadvertently disconnecting the sections from each other, and also, the cable is prevented from stacking up excessively at any point in hose H which might cause a plugging of fluid flow through the hose.

Also, as will be more fully explained, the cable C is provided with a return bend or "S" configuration near its lower end to facilitate the connection and disconnection of the apparatus for driving the drill bit from the hose H. Such reverse bend or "S" configuration of the cable C is indicated at 30 in FIGS. 1 and 5, the details of which will be hereinafter explained.

Although the cable C can be mounted in the hose H with various types of connectors, the particular connector K illustrated in the drawings (FIGS. 1, 3 and 4) is preferred. Each of such connectors K includes a female plug 35 on one end 36 of the cable C and another plug 37 on the other end 38 of the cable C. The plugs 35 and 37 may take numerous forms so long as they provide for a disconnection of the sections 36 and 38 of the electrical cable C. As illustrated in FIG. 3, the plug 35 includes a sleeve 35a of metal or electrical insulating material, a holder plate 35b of electrical insulation material, and retaining portions 35c and 35d which are also electrical insulators and are preferably formed of neoprene or other elastomers, synthetic resin, or plastic. The three electrical conductors 25, 26 and 27 are imbedded in the retaining portions 35c and 35d, one of which is indicated at 25 in FIG. 3.

The male plug 37 is made basically in the same way as the female plug 35 and includes the sleeve 37a, a retaining plate 37b, and retaining portions 37c and 37d formed of synthetic resin, elastomer, or other material such as neoprene. Only the electrical conductor 25 is illustrated in FIG. 3 in connection with plug 37, but it will be from FIG. 4 that all three conductors 25, 26 and 27 are imbedded and secured in the retaining portions 37c and 37d. The adjacent ends of the conductors 25 in the plugs 35 and 37 either interfit or otherwise make contact. The electrical insulation portions of the plugs 35 and 37 may be made from phenol formaldehyde, or any other similar electrically non-conducting material.

A metal connector sleeve or tube 40 is adapted to slide over both the plug 35 and the plug 37 when they are electrically connected together. The tube 40 has a releasable threaded end closure 40a at one end and a fixed end closure 40b which is welded or otherwise affixed to the other end of the tube 40. When the releasable plug 40a is connected in the position shown in FIG. 3, the plugs 35 and 37 are securely held together. In order to disconnect the plugs 35 and 37, the threaded plug or end closure 40a is disengaged and then the plug 35 may be disconnected from the plug 37.

The tube 40 has one or more nuts 40c welded or otherwise secured to the external surface of the tube 40 for receiving threaded bolts 41. The bolts 41 are used for attaching the sleeve 40 to a rigid tubing joint or section 45 formed of steel or other similar material. Such joint 45 has a suitable opening 45a for each of the bolts 41 so that the bolts 41 may be threaded into the nuts 40c for securing the entire connector K to the rigid joint 45.

The steel joint 45 is a part of the flexible hose H and is therefore connected at each end to end couplings X and Y of the hose flexible portion. Such end couplings X and Y are preferably of the type disclosed in United States Patent No. 3,004,779.

It has been found that if the cable C is merely positioned within the hose H and is reeled up on the reel means R, there is a tendency for the cable to take the shortest distance which is along the inside inner surface of the hose H when it is reeled, as indicated in phantom at C' in FIG. 1A. Therefore, if the cable is made up by simply inserting the cable in the hose when the hose is reeled, the length of cable in the hose is shorter than that required to straighten out when the hose straightens out. Under such conditions of assembly, when the hose H is straightened out in use by suspending it in the substantially vertical position during drilling operations, the length of the cable is shorter than the hose H and tends to place an excessive strain on the cable. In fact, in some instances, the strain is sufficient to either pull the cable apart or cause a disconnection at the plugs between the cable sections.

The problem is further complicated by the fluid drag force exerted on the cable C by the flowing of drilling mud or other fluid through the hose H. Such fluid drag tends to force the cable C to the discharge end of the hose H. Thus, when the hose H is reeled or coiled, and assuming the length of the cable is at least equal to the length of the hose H to prevent a pulling apart of the cable or disconnection of the sections, the fact that the cable C assumes the smaller radius indicated by the phantom cable C' (FIG. 1A) results in an excess of cable which is forced to the discharge end of the hose H where it tends to stack up or bunch. If such stacking up of the cable is too great, the flow of mud is cut off or severely restricted.

The present invention provides a method of mounting the cable within the hose H so as to avoid such difficulties. In FIG. 6 a schematic representation of the end portion of the apparatus used for inserting the cable C into the hose H is shown. Thus, the end coupling X is illustrated as being the free end of the particular section which is already reeled in the reel R. An adapter 50 with a tube 51 are connected as shown in FIG. 6 to the end coupling X. The tube 51 is connected to a source of mud or other fluid pressure through an inlet pipe 52. A cap or other closure 51a is provided at the extreme end of the tube 51. The cable C is indicated as having been already positioned within the hose H, with the plug 35 and the end closure 40a attached thereto. It is to be noted that the plug 37 could be attached to the cable C at this point and in fact, the illustration in FIG. 6 is a reversal of the plugs 35 and 37 as compared to FIG. 3.

In any event, the hose is reeled up with the free end 38 of the cable C extended out from the end coupling X. The cable C has its other end fixed (FIG. 1) by the securing mechanism 28 for the first length of the hose and cable being connected together. With the cable C in the position of FIG. 6 and prior to introducing any drilling mud or other fluid under pressure through the opening 52 into the tube 51, the end of the cable 38 is normally exposed beyond the coupling X approximately thirty inches for a 500 foot interval or length of the hose H. The amount of the cable 38 which is exposed depends upon the particular length of the hose section, but such amount is sufficient to provide a length of cable C which is at least equal to, and preferably slightly greater than, the length of the hose H when the cable and hose are straightened out.

Fluid under pressure is then introduced from a suitable source through the inlet pipe 52 and the fluid flow causes the cable C to be forced to travel relative to the flexible hose H throughout the length of the cable C up to the fixed connection at the connector 28. The fluid flow thus forces the cable C away from the inner diameter position C' indicated in FIG. 1A and shifts the cable to the position indicated in solid lines in FIG. 1A which is on the bottom of the hose H when the hose H is reeled on the reel means R. Some slack is thus placed in the cable C and normally the cable C assumes an undulating form or a wave-like form such as indicated in FIG. 2. Such condition exists with the cable and the hose reeled up on the reel R, but thereafter, as will be explained, the cable C tends to straighten out as indicated in FIG. 1 when the hose and the cable C are suspended substantially vertically for the drilling operation.

The hose discharges the mud or other fluid used for feeding the cable C into such slack or undulating condition from the pipe 16 which normally is the inlet (FIG. 1). Therefore, there is actually a reverse flow of the fluid when making the connections of each of the cable and hose sections. After the plug 35 has been forced to the right in FIG. 6 so as to be stopped by the engagement thereof with the coupling X, further pumping of the fluid through the inlet tube 52 is stopped and the adapter 50 is disconnected from such coupling X. The rigid tube 45 (FIG. 3) is then connected to the coupling X and a complete assembly of the connector K is made as illustrated in FIG. 3 so that the tube 45 becomes a continuation of the hose and provides a fixed point for the next operation of attaching another length of cable and hose together. The identical procedure is used for attaching each length of the hose and the cable together until the desired length of the complete hose and cable is obtained. Each length is thus connected with the cable C in the hose H at intervals of approximately 500 feet or at such other intervals as are determined by the diameter of the reel mechanism used, the outside diameter of the cable C and the diameter of a center-line passing through the hose H when reeled. By way of example, the 500 foot sections have been found satisfactory with a reel mechanism having approximately a six foot diameter, a hose H having an outside diameter of 2⅝ inches and an inside diameter of 1½ inches, and a cable C having an outside diameter of ½ of an inch. With the cable thus connected at intervals, the fluid flow will exert a push on the hose and move it to some extent towards the connector K at the discharge end of each hose section, but the amount of hose so moved is not sufficient to prevent the fluid flow or seriously restrict it.

After the last section of the hose H and the cable C are connected together, the lowermost hose coupling X-1 (FIGS. 1 and 5) is connected to a special tubular pipe or drill collar section which includes an adapter 61 and an enlarged bore housing section 62. The housing section 62 is provided with an enlarged bore 62a in the preferred form of the invention for receiving the cable C in a reverse bend or "S" configuration indicated at 30. The cable C is connected above such reverse bend 30 with electrical plugs 64 and 65 of any suitable construction which will permit a disconnection thereof. The lower end of the cable C below the reverse bend 30 extends downwardly to the motor M or other means for imparting the rotation of the drill bit B.

By reason of the construction illustrated in FIG. 5, the cable C may be disconnected at the plugs 64 and 65 when it is desired to release the hose H and the cable C from the motor M and the apparatus associated therewith. In order to make such disconnection of the plugs 64 and 65, the end coupling X-1 may be released from the adapter 61 by a relative rotation so as to disconnect the threads 61a from the end coupling X-1. Then, upon a raising of the end section X-1 with the hose H thereabove, the cable C is pulled upwardly to expose the plugs 64 and 65. During the raising of the cable C the excess cable in the reverse bend 30 is utilized and tends to straighten out. Thus, if the hose H is raised a sufficient distance with the plugs 64 and 65 connected, the reverse bend 30 may be completely straightened out, but such is ordinarily unnecessary. At any rate, after the plugs 64 and 65 are exposed, they may be disconnected by hand, leaving the plug 64 exposed below the coupling X-1. The plug 65 may be forced downwardly by forcing the cable C therebelow to return to the reverse bend position 30 or a position similar thereto. Thus, the hose section H and the apparatus for driving the drill bit B are separated until it is desired to reconnect them, in which case the reverse procedure to that described above is used.

In the use of the apparatus of this invention, and in carrying out the method of this invention, the cable C is mounted within the bore of the hose H so as to prevent its collecting in a mass which might interfere with the normal flow of drilling mud through the hose H in drilling operations, while at the same time, there is some slack in the cable C when it is in the coiled or reeled position to prevent the cable from being broken when the hose is lowered in the well. As previously pointed out, this is accomplished by providing the connections with connectors K at suitable intervals throughout the complete hose length.

The initial insertion of the cable C within the bore of the hose H so as to be in slack or undulating condition when reeled on the reel means R assures that the cable C is not parted or otherwise damaged when the hose H and the cable C are disposed in a suspended or substantially vertical position for drilling operations.

After the hose H is completely connected and is disposed on the reel R with only the portion thereof extending vertically which supports the bit B, the inlet pipe 16 for the drilling mud or other drilling fluid is of course connected to the source of such drilling mud or drilling fluid. Thereafter, the mud or fluid is circulated throughout the full length of the hose H, passing longitudinally externally of the cable C within the bore of the hose H. The connectors C have a longitudinal space adjacent thereto so as to allow the drilling mud or other fluid to pass longitudinally along such connectors K. Thus, with the present invention, the drilling mud is supplied to the drilling bit for drilling operations, while at the same time the electrical power is supplied to the cable C within the hose H to the motor M for rotating the drill bit B.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:
1. In a deep well boring installation, comprising:
 (a) a hollow flexible hose member for conducting drilling mud therethrough,
 (b) an electrical cable disposed in said hose and of such a diameter that the bore of the hose is open at all times for the flow of the drilling mud therethrough,
 (c) a reel for supporting the combined hose member and cable for feeding same to a well bore,
 (d) means for maintaining said electrical cable con- nected to said hose member at longitudinally spaced points throughout the length of the hose member and with the bore of the hose open at all times for the flow of drilling mud therethrough as the combined hose member and cable are fed from the reel to a well bore and also after disposed in a substantially vertical position in a well bore, (e) means for flowing drilling mud into the hose member for conducting such mud therethrough, and (f) said means to maintain said electrical cable connected to said hose member and with the bore thereof open at all times, including:
  (1) means to successively force predetermined lengths of said electrical cable into the flexible hose member when in the reeled condition to provide an adequate amount of electrical cable in the hose member when it is straightened out in the well bore to prevent rupture or disconnection of the cable from the hose member,
  (2) means to limit the extent of each of said predetermined lengths of said electrical cable to prevent such an accumulation of said cable at any point in said hose member as would cause a substantial reduction in the flow of the drilling mud through the hose member, and
  (3) means connecting each of said predetermined lengths of said cable to said hose member.

2. The structure set forth in claim 1, including:
(a) interfitting electrical plugs on adjacent ends of each of said predetermined lengths of said electrical cable to facilitate connection and disconnection of said adjacent ends, and
(b) housing means in which said electrical plugs are disposed for preventing an inadvertent separation of said plugs.

References Cited by the Examiner
UNITED STATES PATENTS

| | | | |
|---|---|---|---|
| 1,066,329 | 7/1913 | Schwedler | 285—119 |
| 1,126,673 | 1/1915 | Johnson | 285—119 |
| 1,800,840 | 4/1931 | Lewin | 285—119 |
| 2,347,912 | 5/1944 | Komives | 29—421 |
| 2,708,566 | 5/1955 | Caldwell | 175—104 X |
| 2,748,358 | 5/1956 | Johnston | 339—16 |
| 2,750,569 | 6/1956 | Moon | 339—16 |
| 2,825,364 | 3/1958 | Cullen et al. | 285—149 |
| 2,869,226 | 1/1959 | Schurman | 29—421 |
| 2,923,755 | 2/1960 | Kissel | 339—89 X |
| 3,007,534 | 11/1961 | Salnikov et al. | 175—104 |
| 3,041,875 | 7/1962 | Reesby | 339—16 X |
| 3,217,282 | 11/1965 | Chevalier et al. | 339—15 |

CARL W. TOMLIN, *Primary Examiner.*

D. W. AROLA, *Assistant Examiner.*